United States Patent
Yun et al.

(10) Patent No.: US 9,696,560 B2
(45) Date of Patent: Jul. 4, 2017

(54) TWO-DIMENSIONAL/THREE-DIMENSIONAL SWITCHABLE DISPLAY APPARATUS

(71) Applicant: SAMSUNG DISPLAY CO., LTD., Yongin-si, Gyeonggi-do (KR)

(72) Inventors: Hae-Young Yun, Suwon-si (KR); Il-Joo Kim, Hwaseong-si (KR); Hyun-Seung Seo, Uiwang-si (KR); Seung-Hoon Lee, Hwaseong-si (KR); Jin-Hwan Kim, Suwon-si (KR); Seung-Jun Jeong, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 14/986,110

(22) Filed: Dec. 31, 2015

(65) Prior Publication Data
US 2016/0116753 A1    Apr. 28, 2016

Related U.S. Application Data

(62) Division of application No. 13/662,357, filed on Oct. 26, 2012, now Pat. No. 9,229,243.

(30) Foreign Application Priority Data

Oct. 27, 2011 (KR) .......................... 10-2011-0110489

(51) Int. Cl.
*G02B 27/26* (2006.01)
*G02B 27/22* (2006.01)
(Continued)

(52) U.S. Cl.
CPC .......... *G02B 27/26* (2013.01); *G02B 27/2214* (2013.01); *G02F 1/1337* (2013.01); *G02F 1/133526* (2013.01); *G02F 1/133528* (2013.01); *G02F 1/133784* (2013.01); *G02F 1/134309* (2013.01); *G02F 2001/133531* (2013.01); *H04N 13/0404* (2013.01)

(58) Field of Classification Search
CPC ........ G02F 2001/133531; G02B 27/26; G02B 27/2214; H04N 13/0404
See application file for complete search history.

(56) References Cited

U.S. PATENT DOCUMENTS 7,058,252 B2    6/2006    Woodgate et al.
7,787,008 B2    8/2010    Fukushima et al.
(Continued)

FOREIGN PATENT DOCUMENTS

KR    1020110104701 A    9/2011

*Primary Examiner* — Paul Lee
*Assistant Examiner* — Jia Pan
(74) *Attorney, Agent, or Firm* — Innovation Counsel LLP (57) ABSTRACT

A new 2D/3D switchable display apparatus matches a polarization direction of light output from a 2D image display panel with a rubbing direction of a lower alignment layer of a liquid crystal lens, and tilts a rubbing direction of an upper alignment layer of the liquid crystal lens and a direction of a polarization axis of a polarizer at a predetermined angle, thereby reducing a loss of light passing through the liquid crystal lens, making it possible to improve luminance of images, improve the quality of 3D images in the horizontal direction, prevent or reduce color separation and moire phenomena, and reduce the manufacturing cost.

8 Claims, 10 Drawing Sheets

(51) Int. Cl.
*G02F 1/1335* (2006.01)
*G02F 1/1337* (2006.01)
*H04N 13/04* (2006.01)
*G02F 1/1343* (2006.01)

(56) References Cited

U.S. PATENT DOCUMENTS

| | | |
|---|---|---|
| 2003/0043319 A1 | 3/2003 | Mirna |
| 2007/0195409 A1 | 8/2007 | Yun et al. |
| 2007/0296911 A1 | 12/2007 | Hong |
| 2009/0122210 A1 | 5/2009 | Im |
| 2009/0153754 A1 | 6/2009 | Jung |
| 2009/0190048 A1* | 7/2009 | Hong ................ G02B 27/2214 349/15 |
| 2010/0309296 A1 | 12/2010 | Harrold et al. |
| 2011/0032438 A1* | 2/2011 | Yun .................... G02F 1/13471 349/15 |
| 2011/0102689 A1* | 5/2011 | Chiu ................ G02B 27/2214 349/15 |
| 2011/0157498 A1* | 6/2011 | Kim ................ G02F 1/134309 349/15 |
| 2011/0228181 A1 | 9/2011 | Jeong et al. |
| 2012/0154697 A1 | 6/2012 | Van Der Horst |

* cited by examiner

TWO-DIMENSIONAL/THREE-DIMENSIONAL SWITCHABLE DISPLAY APPARATUS

PRIORITY

This application is a divisional application of U.S. patent application Ser. No. 13/662,357 filed on Oct. 26, 2012, which claims the benefit under 35 U.S.C. §119(a) of the Korean Patent Application filed in the Korean Intellectual Property Office on Oct. 27, 2011 and assigned Serial No. 10-2011-0110489, the entire disclosure of which is hereby incorporated by reference.

BACKGROUND OF THE INVENTION

Field of the Invention

Embodiments of the present invention relate generally to an apparatus for displaying three-dimensional (3D) images, and more particularly, to a two-dimensional/three-dimensional (2D/3D) switchable autostereoscopic display apparatus.

Description of the Related Art 3D display technologies are classified into so-called stereoscopic display technology that requires viewers to wear special glasses such as liquid crystal shutter glasses to view 3D stereoscopic images, and so-called autostereoscopic display technology that does not require the wearing of glasses.

Devices constructed with stereoscopic display technology can employ liquid crystal shutter glasses, in which left- and right-eye liquid crystal shutters alternately pass and block light during predetermined periods, and in which a shutter glass driving device drives the shutters. Stereoscopic images may be recognized by providing left- and right-eye images independently after separating them. However, stereoscopic display technology has many shortcomings, in particular requiring liquid crystal shutter glasses and their associated devices such as shutter glass driving devices.

Devices employing autostereoscopic display technology have the advantage of displaying 3D images without requiring the viewer to wear shutter glasses. Autostereoscopic display technology may employ a parallax barrier 3D display device or a lenticular 3D display device. The parallax barrier 3D display device has a parallax barrier with apertures in the form of a vertical grid, which is mounted in front of a display panel having pixels arranged in rows and columns. The parallax barrier separates left-eye images for the viewer's left eye from right-eye images for the viewer's right eye, and causes binocular disparity between the different images on the display panel. On the other hand, to display 3D images, the lenticular 3D display device generally uses a lenticular lens having a columnar (or vertical) array of semi-cylindrical lenses, which is put on the display panel, instead of using a parallax barrier.

A 2D/3D switchable lenticular 3D display device includes a display panel and a liquid crystal lens that serves as a lenticular lens depending on the change in refractive index of a liquid crystal material filled between upper and lower substrates. The liquid crystal lens is mounted in front of a 2D display panel, and may switch between 2D and 3D display modes depending on a voltage applied between electrodes thereof.

In the 2D display mode, the voltage applied between or across the electrodes is turned off, i.e. not applied, or its application is stopped. Then, the liquid crystal between the electrodes may maintain its initial alignment state, so the liquid crystal lens no longer serves as a lenticular lens and the light coming out from the 2D display panel is provided to the viewer as 2D images.

In the 3D display mode, the voltage applied between or across the electrodes is turned on. Then, the liquid crystal lens may serve as a lenticular lens by changing the refractive index of the liquid crystal differently depending on the location of the liquid crystal material. As the liquid crystal lens serves as a lenticular lens, the light coming out from the 2D display panel undergoes a change in its propagation direction while passing through the liquid crystal lens, and provides different images to the viewer's left and right eyes, making it possible for the viewer to view stereoscopic images.

In order for the liquid crystal lens to precisely control the images provided to the viewer's left and right eyes in the 3D display mode, polarizers are mounted on the upper and lower substrates. The polarizers absorb the light that proceeds in undesired directions, making it possible to control the direction of the light passing through the liquid crystal lens.

Disadvantageously, however, these polarizers may reduce luminance of the light passing therethrough. A light absorption loss of one polarizer is currently about 7%. Therefore, the polarizers included in the liquid crystal lens are significant causes of luminance reduction.

When a 3D display device uses a liquid crystal display panel as its display panel, an additional luminance loss may occur as follows. The liquid crystal display panel adjusts brightness of the light passing therethrough using two polarizers. The liquid crystal display panel transmits only the light linearly polarized in the vertical or horizontal direction using the polarizers. In the conventional liquid crystal lens, liquid crystal molecules are aligned in an anti-parallel way (e.g., aligned parallel but in opposite directions), and polarizers attached to its upper and lower substrates have their polarization axis in the same direction as the alignment direction of the liquid crystal material.

In order to prevent color separation and moire phenomena which may occur in 3D images, an array direction of liquid crystal lenses is required to be tilted with respect to the pixels arranged in the vertical (or columnar) direction. However, when a polarization direction of the polarized light passing through the 2D display panel is inconsistent with a direction of a polarization axis of polarizers mounted on the liquid crystal lens, a λ/2-phase difference film is required to match them with each other. The λ/2-phase difference film rotates the polarized light output or projected from the 2D liquid crystal display panel as required in the liquid crystal lens. However, when the polarization axis of the transmitted light is rotated by φ by means of the λ/2-phase difference film, a light loss caused by the rotation of the polarization axis may occur, as defined by Equation (1) below.

$$\text{Polarization Axis Rotation Loss} = 1 - \cos^2\phi \quad (1)$$

where φ denotes an angle by which the polarization axis is rotated by the λ/2-phase difference film, and $\cos^2\phi$ denotes a transmittance given when the polarization axis is rotated. For example, for φ=18.5°, the polarization axis rotation loss may be about 10%.

In addition, the polarizers are very expensive. Therefore, a plurality of polarizers used for the 3D display device may increase the total price of the 3D display device to an undesirable degree.

Therefore, there is a need to provide a 2D/3D switchable display apparatus that can reduce the number of polarizers used in the liquid crystal lens and improve its luminance.

SUMMARY OF THE INVENTION

An aspect of an exemplary embodiment of the present invention is to provide a liquid crystal lens and display apparatus capable of 2D/3D switching and of providing high luminance.

Another aspect of an exemplary embodiment of the present invention is to provide a 2D/3D switchable liquid crystal lens and display apparatus, a manufacturing process of which may be reduced, and which may be manufactured at low cost.

Further another aspect of an exemplary embodiment of the present invention is to provide a liquid crystal lens and display apparatus, a thickness of which may be reduced, and which may provide high-quality 3D images.

In accordance with one aspect of the present invention, a two-dimensional/three-dimensional (2D/3D) switchable display apparatus includes a 2D image display panel including a plurality of pixels arranged in a matrix of rows and columns, and a first polarizer situated on the pixels and configured to pass an image output from the pixels, the image having light polarized parallel to a first polarization axis; a first electrode layer formed on the 2D image display panel; a first alignment layer formed on the first electrode layer and having an alignment direction parallel to the first polarization axis; a second alignment layer formed on the first alignment layer and having an alignment direction that is oriented at a predetermined angle of θ with respect to the first polarization axis; a liquid crystal layer having liquid crystal filled between the first and second alignment layers; a second electrode layer formed on the second alignment layer; and a second polarizer situated on the second electrode layer and having a second polarization axis that is oriented at the predetermined angle of θ with respect to the first polarization axis.

In accordance with another aspect of the present invention, a liquid crystal lens includes a lens lower substrate; a lens lower electrode layer formed on the lens lower substrate; a first alignment layer formed on the lens lower electrode layer and rubbed in a direction of a first polarization axis; a lens upper substrate; a lens upper electrode layer formed on the lens upper substrate; a second alignment layer formed on the lens upper electrode layer and aligned in a direction that forms a predetermined acute angle θ with the first polarization axis; a liquid crystal layer having liquid crystal filled between the first and second alignment layers; and a second polarizer formed on the lens upper substrate and having a second polarization axis that forms the predetermined acute angle θ with the first polarization axis.

The plurality of pixels may be repeatedly arranged in row and column directions, wherein a subpixel of each pixel has a length 'a' in the row direction and a length 'b' in the column direction. The angle θ may be determined by the following equation;

$$\theta = \tan^{-1}(nb/ma)$$

where n and m are positive integers.

One of the first and second electrode layers may include a plurality of conductive lines, and the plurality of conductive lines may be oriented parallel to each other and oriented at the angle of θ with respect to the column direction.

A lens axis of a liquid crystal lens formed by the liquid crystal layer and the second polarization axis may be parallel to each other.

A liquid crystal lens formed by the liquid crystal layer may be a GRadient INdex (GRIN) lens.

A liquid crystal lens formed by the liquid crystal layer may be a Fresnel zone plate.

The second electrode layer may include a plurality of double-layered conductive lines isolated by an insulating layer, and each of the conductive lines may extend in a direction of the second polarization axis.

Each of the pixels arranged in the rows may have red (R), green (G) and blue (B) subpixels, and an array of pixels parallel to lens axes of liquid crystal lenses formed in a 3D display mode may be a repeating arrangement of R, G and B subpixels.

An alignment direction of the first alignment layer and an alignment direction of the second alignment layer may be upside-down twisted by an angle of θ.

The 2D/3D switchable display apparatus of claim 1 may further include a first substrate positioned between the 2D image display panel and the first electrode; and a second substrate positioned between the second electrode layer and the second polarizer.

BRIEF DESCRIPTION OF THE DRAWINGS

The above and other aspects, features and advantages of certain exemplary embodiments of the present invention will be more apparent from the following description taken in conjunction with the accompanying drawings, in which.

The figures are not necessarily to scale.

DETAILED DESCRIPTION OF EXEMPLARY EMBODIMENTS

A 2D/3D switchable display apparatus and a method for manufacturing a liquid crystal lens for the same according to an embodiment of the present invention will be described in detail below. Although many figures will be disclosed in this specification by way of example, it should be noted that these figures are not intended to limit the scope and sprit of the present invention unless defined in the appended claims. The same drawing reference numerals used in the specification and drawings will be understood to refer to the same elements, features and structures.

Figure 1:
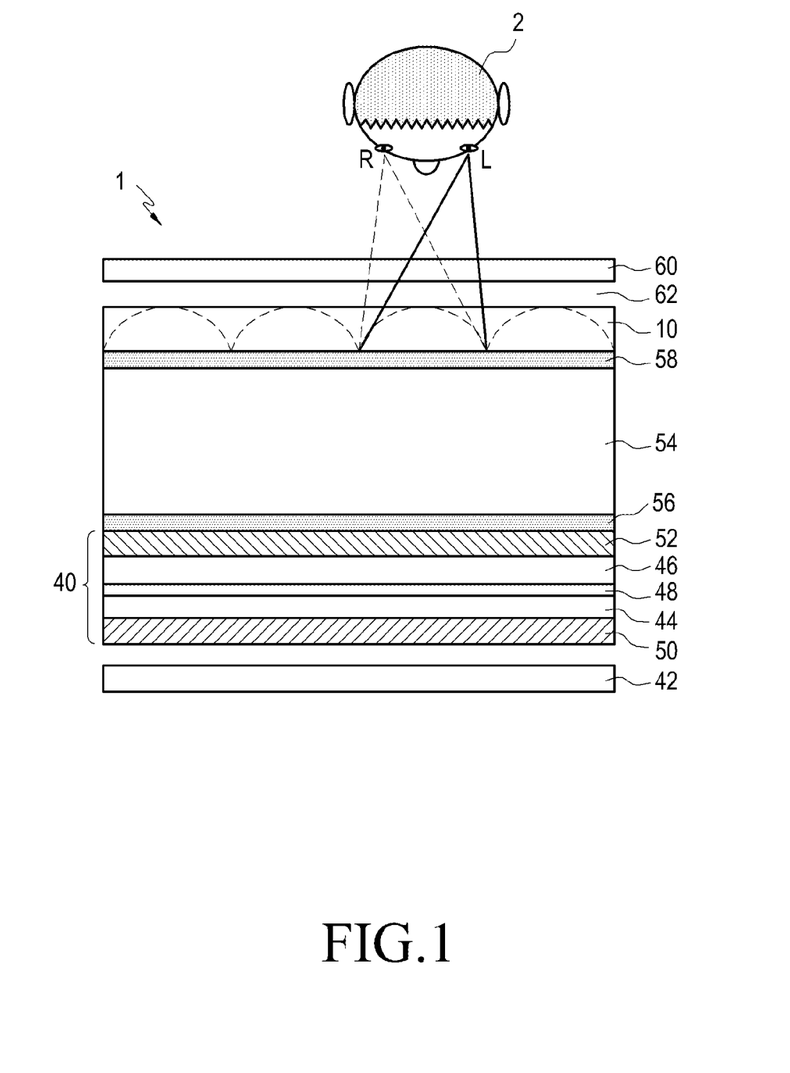
FIG. 1 is a cross-sectional view of a 2D/3D switchable display apparatus according to an embodiment of the present invention.

FIG. 1 is a cross-sectional view of a 2D/3D switchable display apparatus according to an embodiment of the present invention.

Referring to FIG. 1, a 2D/3D switchable display apparatus 1 includes a 2D liquid crystal display panel 40 and a liquid crystal lens 10 situated over the 2D liquid crystal display panel 40.

Although the 2D/3D switchable display apparatus 1 having the 2D liquid crystal display panel 40 will be described, it will be understood by those of ordinary skill in the art that other display panels such as Cathode Ray Tubes (CRTs), Plasma Display Panels (PDPs), Organic Light-Emitting Diodes (OLEDs) and Field Emission Displays (FEDs) may also be used in place of the 2D liquid crystal display panel 40.

The 2D liquid crystal display panel 40 provides 2D images in parallel to a first polarization axis. In other words, the 2D images from the 2D liquid crystal display panel 40 are output or projected through a polarizer having the first polarization axis.

The 2D liquid crystal display panel 40 generally includes pixels arranged in the form of a matrix of rows and columns. The 2D liquid crystal display panel 40 includes a pair of transparent substrates 44 and 46 spaced apart and positioned in parallel to each other, with a liquid crystal material 48 filled between the substrates 44 and 46. Thin Film Transistors (TFTs) are formed on the front surface (e.g., inner surface) of the substrate 44 to correspond to the pixels. Gate and source electrodes of the TFTs are connected to gate lines and data lines associated with corresponding rows and columns, respectively, and drain electrodes thereof are connected to pixel electrodes. A color filter and a black matrix may be formed on the front surface of the substrate 44.

Polarizers 50 and 52 are attached to the rear surfaces (or outer surfaces) of the substrates 44 and 46, respectively. Accordingly, light from a back light unit (BLU) 42 passes through the polarizers 50 and 52 to be linearly polarized parallel to the first polarization axis, and the transmitted polarized light passes through the 2D liquid crystal display panel 40 to fall incident upon the liquid crystal lens 10. Therefore, the upper polarizer 52 has a polarization axis generally parallel to the first polarization axis. The lower polarizer 50 may generally have a polarization axis perpendicular to the first polarization axis.

The liquid crystal lens 10 is spaced apart from the 2D liquid crystal display panel 40 according to its lens focal length. Accordingly, a gap spacing layer is situated between the liquid crystal lens 10 and the 2D liquid crystal display panel 40.

The gap spacing layer may be a gap spacing substrate 54 formed of transparent glass or plastic. The gap spacing substrate 54 is formed thick enough so that the lens focal length between lens units formed by the liquid crystal lens 10 and pixels in the 2D liquid crystal display panel 40 is properly maintained.

The bottom surface of the gap spacing substrate 54 is fixed to the top surface of the 2D liquid crystal display panel 40 by an optical adhesive 56, and the top surface thereof is fixed to the bottom surface of the liquid crystal lens 10 by an optical adhesive 58. The optical adhesives 56 and 58 are made of an optically transparent material so that refractive indexes of the optical adhesives 56 and 58 may not be substantially different from the refractive indexes of the 2D liquid crystal display panel 40, the gap spacing substrate 54 and the liquid crystal lens 10.

A glass cover plate 60 may be situated over the top surface of the liquid crystal lens 10 to protect the liquid crystal lens 10. The glass cover plate 60 may be formed of tempered glass.

In addition, an air gap 62 of 5 mm or more may be situated between the liquid crystal lens 10 and the glass cover plate 60.

Figure 2:
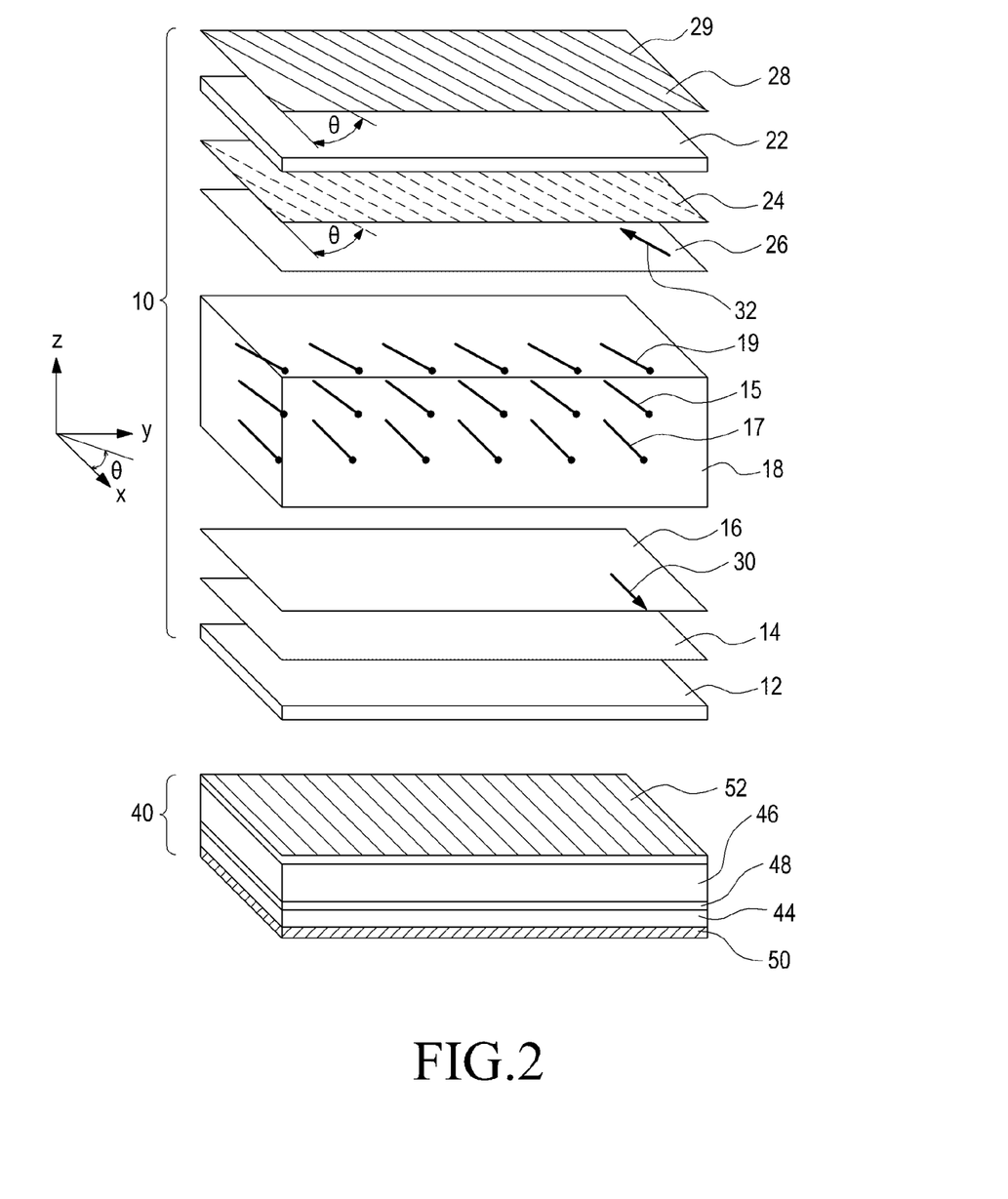
FIG. 2 is an exploded perspective view showing a liquid crystal lens according to an embodiment of the present invention.

FIG. 2 is an exploded perspective view showing a liquid crystal lens in the 2D/3D switchable display apparatus shown in FIG. 1, according to an embodiment of the present invention.

Referring to FIG. 2, the liquid crystal lens 10 includes a first (or lower) substrate 12, a second (or upper) substrate 22, a liquid crystal layer 18 situated between the first and second substrates 12 and 22, and a second polarizer 28 formed on the top surface of the second substrate 22.

The first (or lower) substrate 12 is a plate formed of transparent glass or plastic, and a first electrode layer 14 is formed on the top surface thereof. The first electrode layer 14 is a common electrode that can be formed by depositing a transparent material such as Indium Tin Oxide (ITO) and/or Indium Zinc Oxide (IZO) over the top surface of the first substrate 12.

A first (or lower) alignment layer 16 is formed on the first (or common) electrode layer 14, and the first alignment layer 16 is aligned in a direction parallel to a first direction 30 (e.g., a direction of the polarization axis of the polarizer 52 situated on a light outputting side of the 2D liquid crystal display panel 40).

The second (or upper) substrate 22 has a second (or upper) electrode layer 24 on its bottom surface, and a second (or upper) alignment layer 26 thereunder. The upper substrate 22 is a plate that can be formed of the same transparent glass or plastic as that of the lower substrate 12. The second (or upper) electrode layer 24, as described below in detail, has stripe electrodes 23 that extend long at an angle θ with respect to the x-axis direction, as shown in the drawing. Theses electrodes 23 may be formed by patterning a transparent conductor layer of ITO or IZO by means of, for example, a known photolithography technique. The second (or upper) alignment layer 26 under the upper electrode layer 24 has an alignment direction of a second direction 32, which is an extension direction (e.g., a direction with an angle of θ with respect to the x-axis direction) of the electrodes 23.

The second polarizer 28 is affixed to the front surface of the second substrate 22. A polarization axis 29 of the second polarizer 28 is parallel to the extension direction of the electrodes 23 formed on the upper electrode layer 24. Therefore, it should be noted that the polarization axis 29, the extension direction of the electrodes 23, and the second direction 32 on the upper alignment layer 26 are all parallel to one another.

The liquid crystal layer 18 is situated between the first (or lower) alignment layer 16 and the second (or upper) alignment layer 26. The liquid crystal layer 18 is filled with liquid crystal, and while liquid crystal molecules adjacent to the first alignment layer 16 are pre-tilted in the first direction 30, liquid crystal molecules adjacent to the second alignment layer 26 are pre-tilted in the second direction 32.

It will be understood by those of ordinary skill in the art that available techniques for determining an alignment direction of liquid crystal molecules may be classified into a technique using rubbing, an optical alignment technique using tilted ion beams or Ultraviolet (UV) light, and a field applying technique according to the properties of the alignment material in use. For example, alignment of liquid crystal molecules by the rubbing method may be accomplished by coating a polyimide layer on a substrate, pre-baking the polyimide layer, heating the polyimide layer to remove a solvent therein, baking the polyimide layer, and forming a polymer material by acetylation to form an alignment layer, and then shifting the substrate on which the alignment layer is formed, in a direction opposite to a rotation direction of a roller having rayon. Therefore, in accordance with an embodiment of the present invention, in order to align liquid crystal molecules adjacent to the first alignment layer 16, the liquid crystal molecules are aligned using the rubbing method by forming the lower alignment layer 16 on the lower substrate 12 and then rubbing the lower substrate 12 in the first direction 30. In the same manner, an alignment direction of liquid crystal molecules adjacent to the second (or upper) alignment layer 26 is achieved by rubbing that shifts the upper substrate 22 in the second direction 32. These alignments of liquid crystal molecules may be achieved by rubbing the lower and upper alignment layers 16 and 26, and then filling liquid crystal therebetween.

However, it will be understood by those of ordinary skill in the art that in addition to the above described rubbing technique, an optical alignment technique, a field applying technique, and/or any combination thereof may also be used depending on the properties of the alignment layer. For example, an alignment direction of an alignment layer made of organic-inorganic polysiloxane, in which pre-tilt functional groups are bonded, may be achieved by tilted irradiation of tilted UV or ion beams. As another example, rearrangement of molecules in the alignment layer may be achieved by obliquely irradiating UV light upon an alignment layer of low molecular-weight azo dye derivatives. Due to heating of the alignment layer, the rearranged molecules are stabilized and liquid crystal molecules are aligned in a specific direction.

Figure 3A:
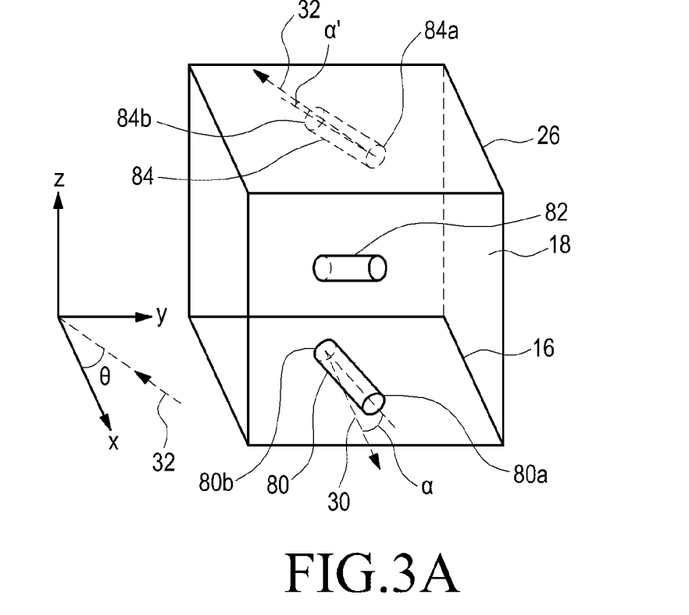
FIGS. 3A and 3B show exemplary arrays of liquid crystal lens according to an embodiment of the present invention.

FIG. 3A shows relationships among locations of liquid crystal molecules placed in a light transmission direction. For convenience of description, only the liquid crystal molecules 80, 82 and 84 placed in the light transmission direction (i.e., z-axis direction) are shown. The first liquid crystal molecule 80 represents a molecule aligned on the lower alignment layer 16, the central liquid crystal molecule 82 represents a molecule in the center of the liquid crystal layer 18, and the last liquid crystal molecule 84 represents a molecule aligned on the upper alignment layer 26. An end 80b of the major axis of the first liquid crystal molecule 80 is in contact with the lower alignment layer 16, and the other end 80a thereof is pre-tilted at an angle α of about 2 to 7° with respect to the x-axis direction (e.g., the first direction 30 which is the direction of the polarization axis of the polarizer 52). An end 84a of the major axis of the last liquid crystal molecule 84 is in contact with the upper alignment layer 26, and the other end 84b thereof is pre-tilted at a pre-tilt angle α' of about 2 to 7° with respect to the direction of the polarization axis 29 of the second polarizer 28 (e.g., the second direction 32 which is the extension direction of the second electrode layer 24). As a result, the liquid crystal molecules 80, 82 and 84 are aligned to be twisted in the light transmission direction (or z-axis direction). In other words, the first and last liquid crystal molecules 80 and 84 have upside-down twisted alignment directions having an angle θ. Therefore, the tilt angle of θ is approximately (given variance in the angles α and α') an angle between the second direction 32 (or straight line) and the first direction 30 (or straight line). In other words, the tilt angle of θ is approximately an angle between the major axes of the first and last liquid crystal molecules 80 and 84 on the planes parallel to the lower and upper alignment layers 16 and 26.

Figure 3B:
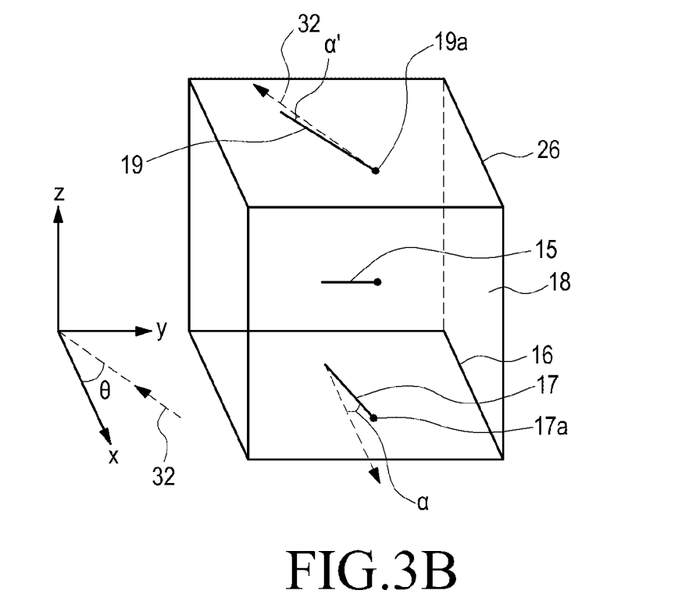

FIG. 3B shows directors instead of the liquid crystal molecules shown in FIG. 3A. For convenience of description, directors are shown instead of the liquid crystal molecules. The directors may be defined to represent directions of the major axes of the liquid crystal molecules, and points 17a and 19a on the directors represent portions close to the viewer's eyes, i.e., portions 80a and 84a of the liquid crystal molecules 80 and 84, respectively. Directors 17, 15 and 19 in FIG. 3B respectively correspond to the liquid crystal molecules 80, 82 and 84 in FIG. 3A. Therefore, it should be noted that the directors 17, 15 and 19 shown in FIG. 2 represent alignment directions of the liquid crystal molecules, for convenience of illustration.

A method of setting a tilt angle θ will be described below. Because a plurality of viewer's views are given in the direction of a row of pixels in order to display 3D images, preventing the degradation of image quality in the horizontal direction is more important than preventing the degradation of image quality in the vertical direction. Therefore, embodiments of the invention seek to improve the degradation in image quality which may be caused by color separation and moire phenomena in the horizontal direction. The tilt angle θ is defined as an angle between lens axes of lenticular lenses (e.g., semi-cylindrical lenses) situated on pixels arranged in rows and columns, and a column direction of the pixels in the 2D display panel.

Figure 4A:
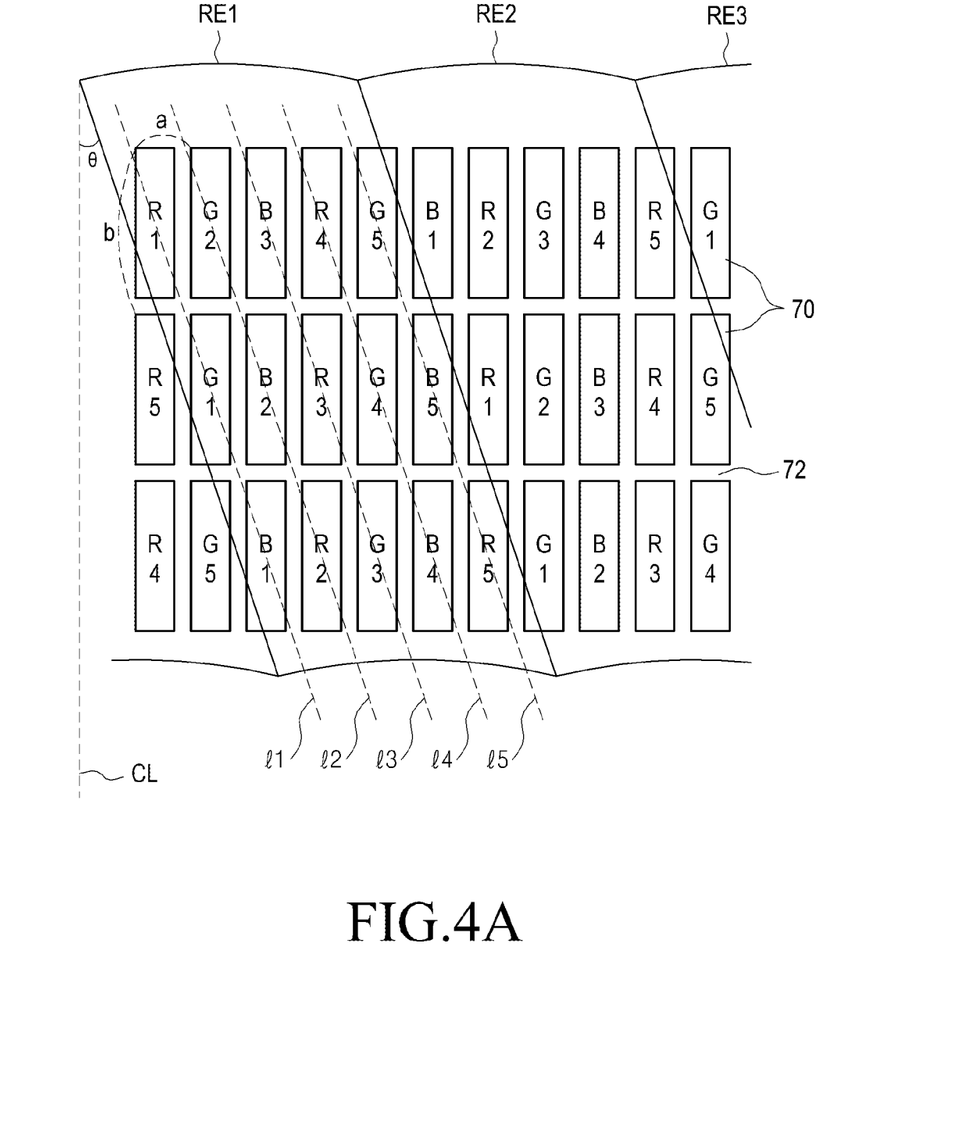
FIGS. 4A to 4C show tilt angles of lenticular lenses when views are arranged on each row of subpixels.

FIG. 4A shows a tilt angle of lenticular lenses when views are arranged on each row of subpixels. Referring to FIG. 4A, reference numeral 70 represents subpixels, and reference numeral 72 represents a black matrix for preventing light transmission. As illustrated, in the case of five views, in each row, view numbers 1 to 5 are repeatedly placed on R, G and B subpixels that are sequentially repeated. In adjacent rows, the same view numbers are placed along adjacent column directions, rather than being placed on subpixels adjacent to the same column directions. Therefore, straight lines passing through the centers of the subpixels having the same view numbers are tilted and oriented parallel to each other. As shown in FIG. 4A, for the case of five views, a straight line l1 passing through the centers of the subpixels having the view number 1, a straight line l2 passing through the centers of the subpixels having the view number 2, a straight line l3 passing through the centers of the subpixels having the view number 3, a straight line l4 passing through the centers of the subpixels having the view number 4, and a straight line l5 passing through the centers of the subpixels having the view number 5 are parallel to one another, and each have an angle of θ with respect to a column line CL. Therefore, each of the lenticular lenses RE1 to RE3 should include straight lines l1 to l5 corresponding to the five views. The straight line l3 is a lens axis of the lenticular lens RE1. In order to display 2D images, when the liquid crystal lens does not serve as a lenticular lens, R, G and B subpixels should be repeatedly arranged on each row. In order to display 3D images, when the liquid crystal lens 10 serves as a lenticular lens, R, G and B subpixels on each of the straight lines l1 to l5 having the same views should be sequentially arranged in a repeated manner.

It can be seen that a tilt angle θ of the lenticular lenses RE1 to RE3 of the liquid crystal lens 10 shown in FIG. 4A is defined as $\tan^{-1} a/b$, where 'a' and 'b' denote horizontal and vertical lengths of each subpixel, respectively.

Figure 4B:
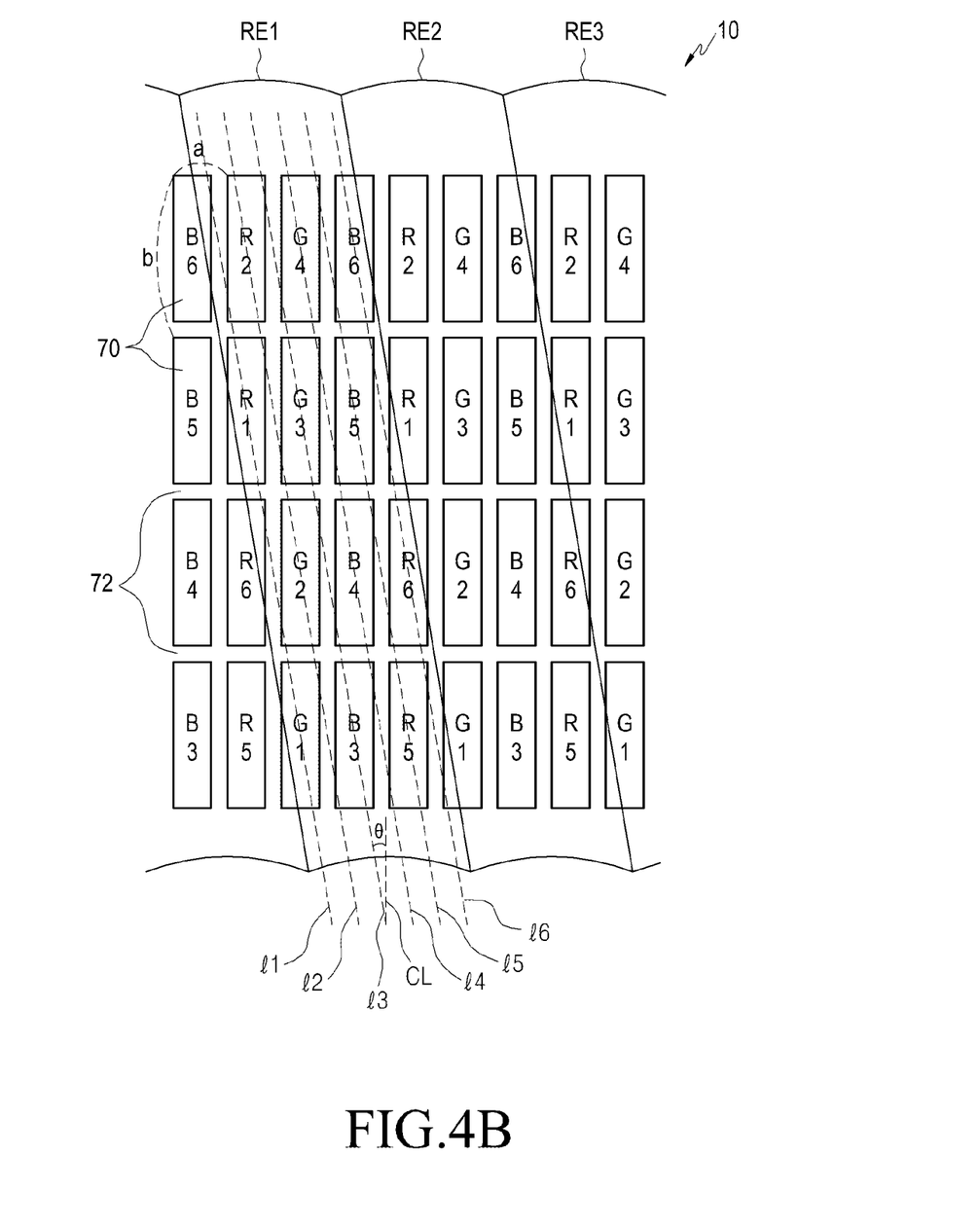

FIG. 4B shows a tilt angle θ of lenticular lenses when views are arranged on every two rows, for the case of six views.

As shown in FIG. 4B, six straight lines l1 to l6 passing through the centers of the subpixels having the same views are placed in each of the lenticular lenses RE1 to RE3 of the liquid crystal lens 10. As described above, each of the six straight lines l1 to l6 passes through the centers of the R, G and B subpixels being repeated, and the six straight lines l1 to l6 are parallel to one another. As stated above, R, G and B subpixels on each row are repeatedly arranged. Therefore, each of the straight lines l1 to l6 has a tilt angle θ with respect to a column line CL. A tilt angle θ of the lenticular lenses RE1 and RE3 of the liquid crystal lens 10 shown in FIG. 4B is $\tan^{-1} a/2b$, where 'a' and 'b' denote horizontal and vertical lengths of each subpixel, respectively.

Figure 4C:
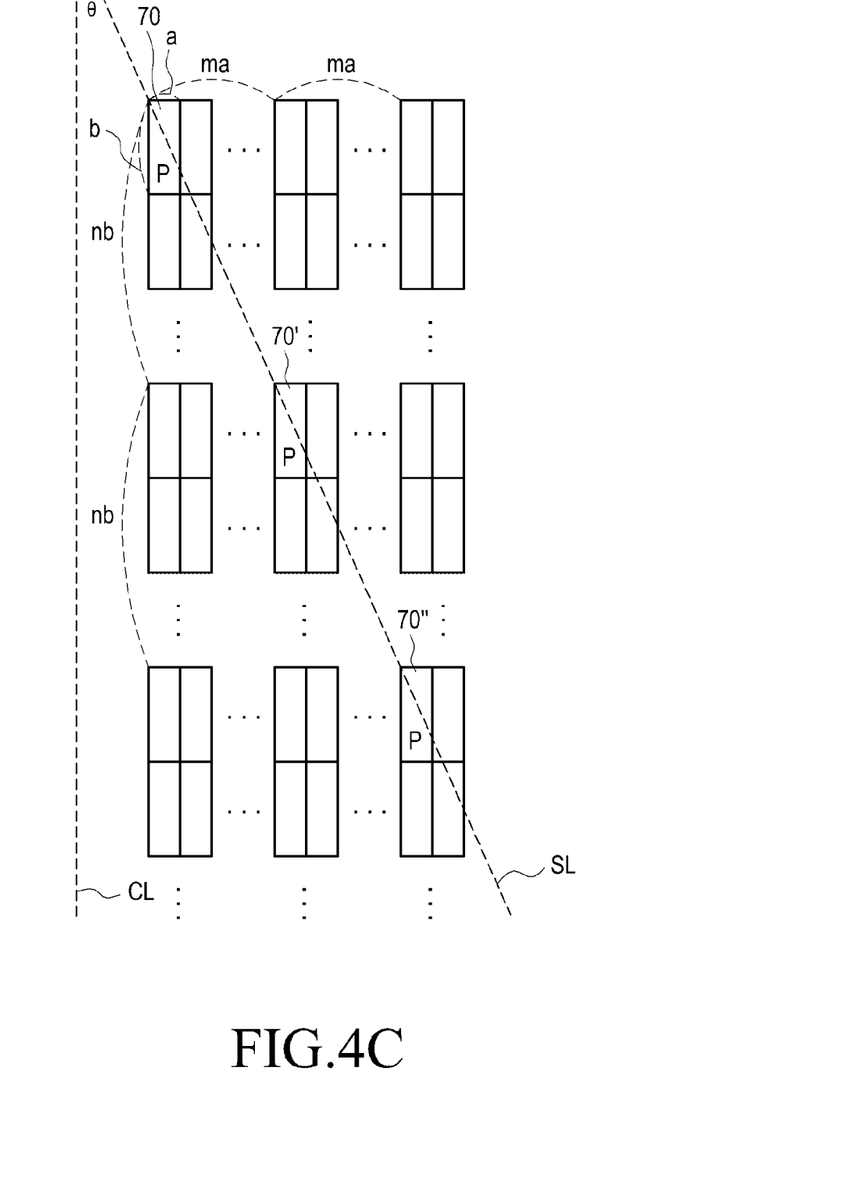

FIG. 4C shows a way to derive a general equation for determining a tilt angle θ. As illustrated, an angle between a straight line SL passing through the centers of subpixels 70, 70' and 70" having the same view number P and a column line CL of subpixels is a tilt angle θ. The tilt angle θ is defined as in Equation (2) below, because the subpixels 70, 70' and 70" are repeatedly arranged in n rows and m columns:

$$\theta = \tan^{-1}(nb/ma) \quad (2)$$

where 'a' and 'b' denote horizontal and vertical lengths of each subpixel, respectively.

For example, in FIG. 4A, if a ratio of 'a' to 'b' (i.e., aspect ratio) is 1/3, θ is about 18.5° because m=n=1.

Figure 5:
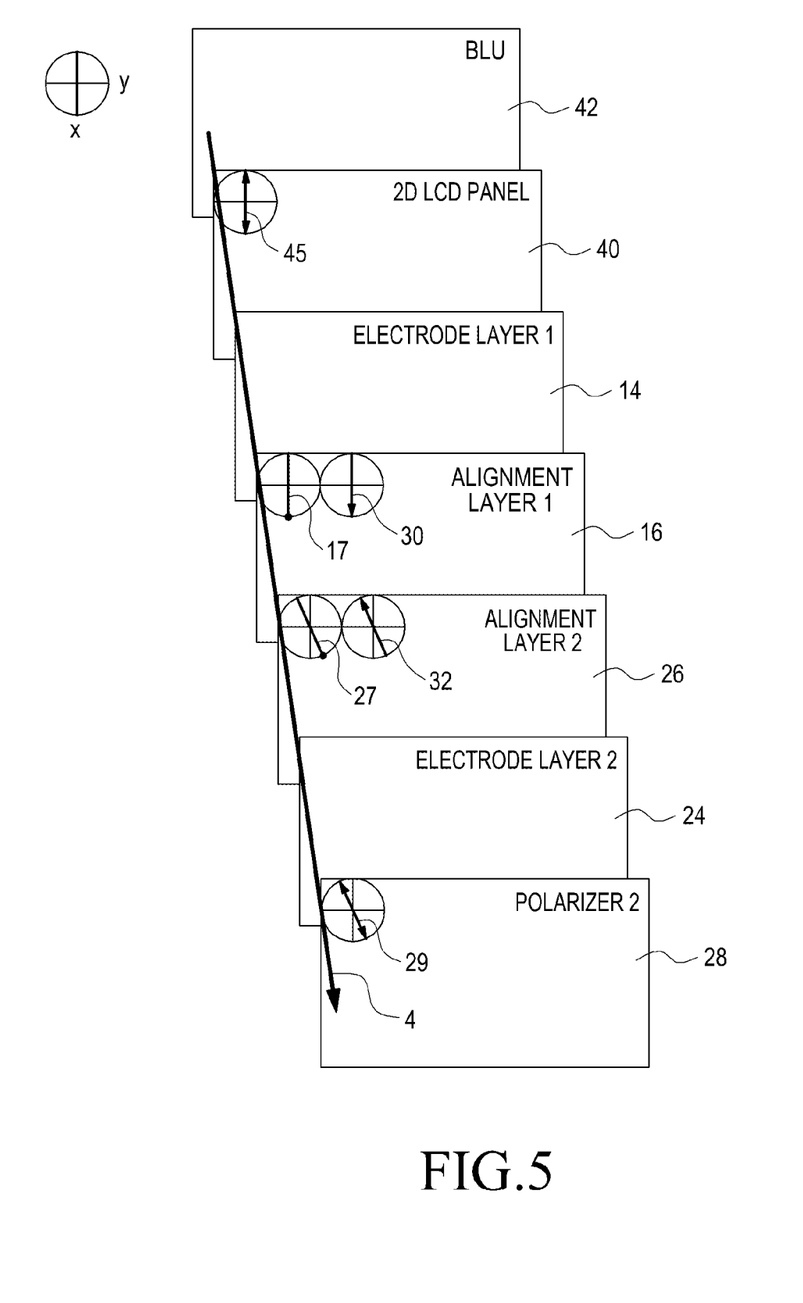
FIG. 5 shows a process in which light output from an image display panel passes through a liquid crystal lens according to an embodiment of the present invention.

FIG. 5 shows a process in which light output from a 2D liquid crystal display panel passes through a liquid crystal lens according to an embodiment of the present invention.

Referring to FIG. 5, light from the back light unit (BLU) 42 is polarized in a direction (x-axis direction) parallel to a first polarization axis 45, and is provided to the liquid crystal lens 10 passing through the 2D liquid crystal display panel 40. The polarized light corresponds to an image displayed on the 2D liquid crystal display panel 40. In FIG. 5, reference numeral 4 represents a progress direction of the light.

The polarized light provided from the 2D liquid crystal display panel 40 is incident upon the first alignment layer 16 formed on the first electrode layer 14, is twisted along an alignment direction of directors of liquid crystal molecules in the liquid crystal layer 18 at a predetermined tilt angle θ, and then passes through the second polarizer 28 having the second polarization axis 29, having already passed through the second alignment layer 26 and the second electrode layer 24. In FIG. 5, reference numerals 17 and 27 represent alignment directions of directors of liquid crystal molecules adjacent to the first and second alignment layers 16 and 26, respectively.

It is to be noted that a polarization direction of polarized 2D images provided from the 2D liquid crystal display panel 40 is the same as the alignment direction of the first alignment layer 16. In other words, no additional polarizer or λ/2-phase difference film is needed between the 2D liquid crystal display panel 40 and the first alignment layer 16 because the alignment direction of the first alignment layer 16 is the same as the polarization direction of 2D images provided from the 2D liquid crystal display panel 40. As a result, the liquid crystal lens 10 may precisely adjust the direction of light passing through the liquid crystal lens 10, using only one polarizer 28.

Therefore, compared to the conventional liquid crystal lens that needs two polarizers and a λ/2-phase difference film and thus undergoes significant light loss, the 2D/3D switchable display apparatus 1 may reduce the light loss due to the liquid crystal lens 10, contributing to the improvement in luminance of images, as it uses only one polarizer.

The 2D/3D switchable display apparatus 1 may reduce the number of polarizers required for the liquid crystal lens 10, thereby simplifying the process of manufacturing the apparatus, and making it possible to reduce thickness, weight and price of the apparatus. Accordingly, a lightweight, thin 2D/3D switchable display apparatus 1 may be manufactured at low price.

Figure 6A:
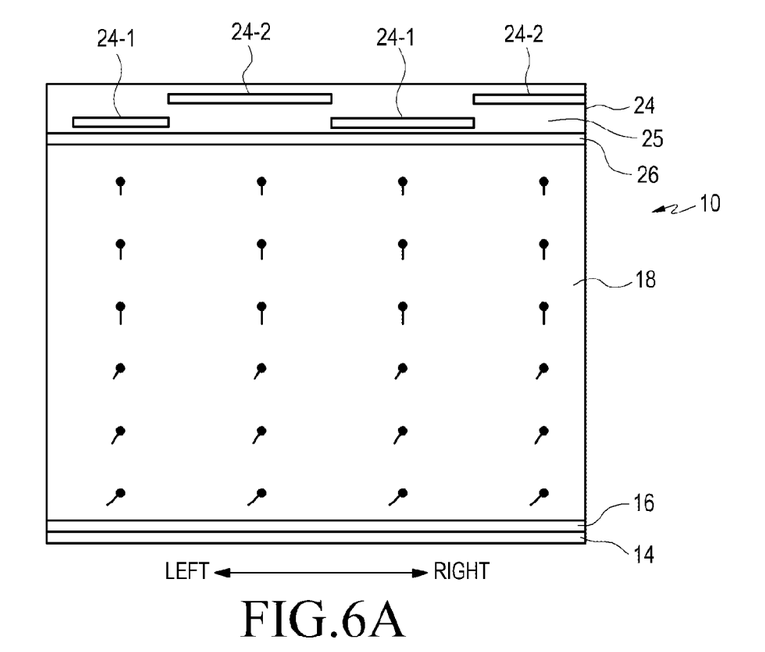
FIGS. 6A and 6B show a comparison between before and after a voltage is applied between electrodes of a liquid crystal lens according to an embodiment of the present invention.
Figure 6B:
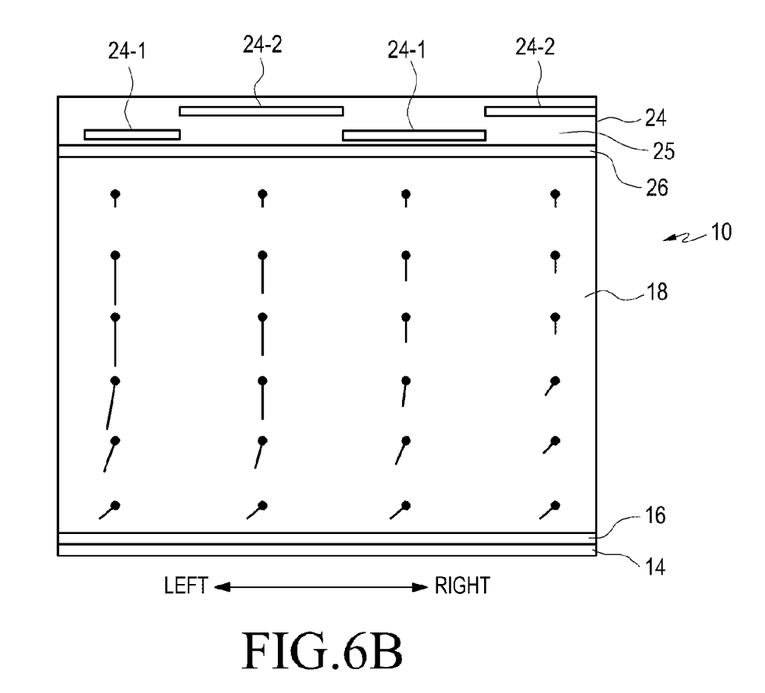

FIGS. 6A and 6B show a comparison between states before and after a voltage is applied between electrode layers of a liquid crystal lens according to an embodiment of the present invention. Specifically, FIGS. 6A and 6B are cross-sectional views taken in the direction perpendicular to the y-axis direction of the second electrode layer 24 having double-layered conductive lines 24-1 and 24-2 of the liquid crystal lens 10.

FIG. 6A shows a 2D display mode where the 2D/3D switchable display apparatus 1 displays 2D images, and in this state, no voltage is applied between the two electrode layers 14 and 24 of the liquid crystal lens 10. When no voltage is applied, liquid crystal directors of the liquid crystal layer 18 maintain their initial vertically-aligned state. Accordingly, refractive indexes of liquid crystal molecules in the liquid crystal layer 18 have constant values in the horizontal direction from the left to the right in FIG. 6A. Therefore, light passes through the liquid crystal layer 18 without change in its progress direction. In this case, the liquid crystal lens 10 may serve as a light transmissive substance on the 2D liquid crystal display panel 40.

FIG. 6B shows a 3D display mode where the 2D/3D switchable display apparatus 1 displays 3D images, and in this state, a voltage is applied between both electrode layers 14 and 24 of the liquid crystal lens 10. Specifically, FIG. 6B shows an example where gradually higher voltages are applied to the both electrode layers 14 and 24 from the right to the left. In a case where the liquid crystal has positive dielectric anisotropy, when such voltages are applied, directors of liquid crystal molecules adjacent to the alignment layers 16 and 26 maintain their initial alignment state, whereas as they go from the right to the left in the liquid crystal layer 18, directors of liquid crystal molecules located in the central portion of the liquid crystal layer 18 may increasingly stand up straight and directors of liquid crystal molecules located on the leftmost side may almost stand up straight (as viewed from the perspective of FIG. 6B). Accordingly, when such voltages are applied, as they go from the right to the left in the liquid crystal layer 18, refractive indexes of liquid crystal molecules increase gradually. Thus, the light passing through the liquid crystal layer 18 may be differently refracted depending on the refractive indexes of liquid crystal molecules. Therefore, the right portion having the lowest refractive index corresponds to the central portion of the liquid crystal lens 10, while the left portion having the highest refractive index corresponds to the edge portion of the liquid crystal lens 10. In a case where the liquid crystal has negative dielectric anisotropy, when gradually higher voltages are applied to both electrode layers 14 and 24 from the right to the left, the right portion may have highest refractive index and thus correspond to the edge portion of the liquid crystal lens 10, while the left portion may have the lowest refractive index and thus correspond to the central portion of the liquid crystal lens 10.

Although it has been described with reference to FIGS. 6A and 6B that the first electrode layer 14 is a common electrode layer and the second electrode layer 24 is formed of double-layered conductive lines 24-1 and 24-2, it should be noted that on the contrary, the first electrode layer 14 may be formed of patterned conductive lines and the second electrode layer 24 may be formed as a common electrode layer. In addition, FIGS. 6A and 6B show an example where the second electrode layer 24 includes multi-layered conductive lines 24-1 and 24-2 and the double-layered conductive lines 24-1 and 24-2 are isolated by a vertical transparent insulating layer 25 and arranged in a zigzag pattern. If the double-layered conductive lines 24-1 and 24-2 are arranged zigzag in this way so that their adjacent edges may overlap, a greater number of conductive lines may be disposed, contributing to the removal of gaps between adjacent electrode lines. If the number of conductive lines increases, a greater variety of voltages may be applied in the horizontal direction, facilitating distribution of refractive indexes of liquid crystal molecules in a desired type of the liquid crystal lens.

Figure 7A:
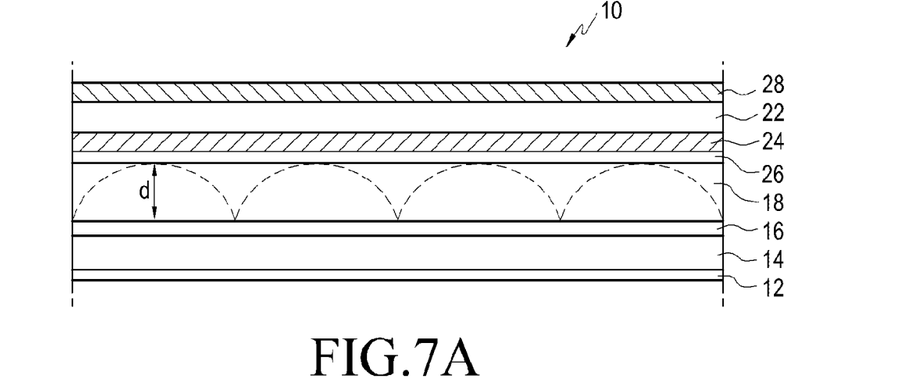
FIGS. 7A to 7C show a GRIN lens-type liquid crystal lens according to an embodiment of the present invention.

FIG. 7A shows a GRIN lens-type liquid crystal lens according to an embodiment of the present invention.

Referring to FIG. 7A, the liquid crystal lens 10 may be formed as a GRadient INdex (GRIN) type lens. In the 3D display mode, voltages are applied to both electrode layers 14 and 24 of the GRIN-type liquid crystal lens 10 so that distribution of refractive indexes of liquid crystal molecules in the liquid crystal layer 18 may correspond to the shape of the lenticular lens. This GRIN-type liquid crystal lens 10 realizes a lensing effect that uses the light refraction phenomenon.

Figure 7B:
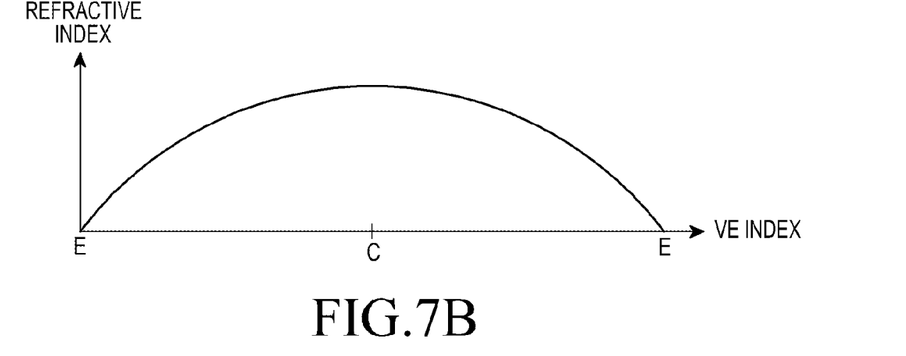

In FIG. 7A, a plurality of GRIN lenses corresponding to the lenticular lenses are sequentially formed in the horizontal direction. FIG. 7B shows a single GRIN lens for convenience of description and illustration, in which E represents an edge of the GRIN lens and C represents the center of the GRIN lens.

Figure 7C:
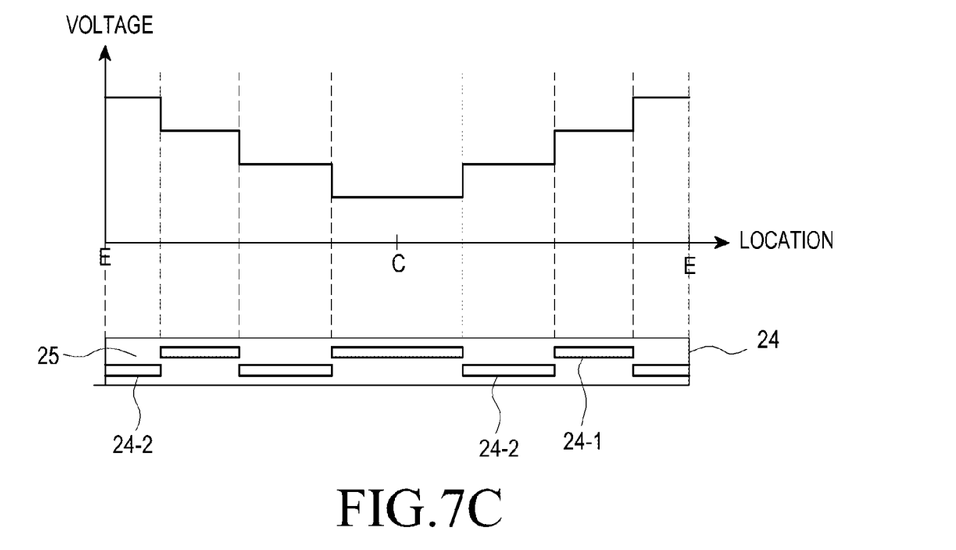

FIG. 7C shows voltages applied to the double-layered conductive lines 24-1 and 24-2 to form the GRIN lens shown in FIG. 7B in a case where the liquid crystal used in the liquid crystal layer 18 has positive dielectric anisotropy. The common electrode layer 14 is grounded. The lowest voltage is applied to a conductive line 24-1 placed at the center C of the GRIN lens, so the center C has the lowest refractive index. As they go to the edges, the conductive lines are provided with higher voltages gradually, so their refractive indexes gradually increase.

Figure 8A:
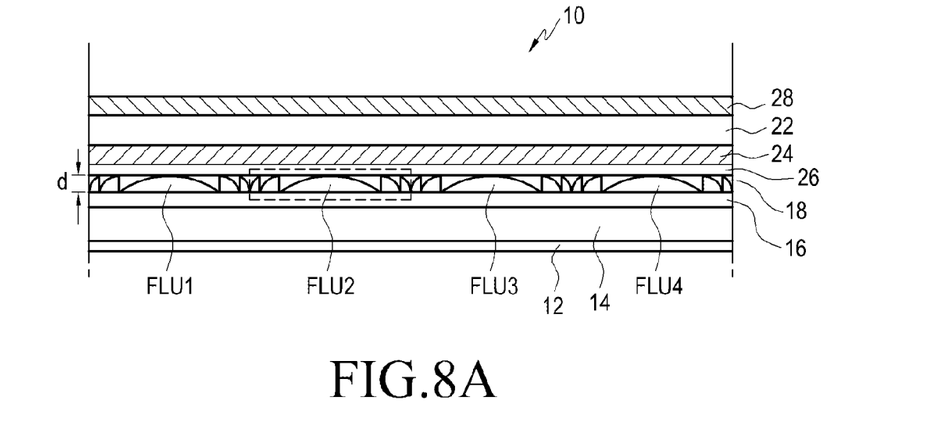
FIGS. 8A to 8C show a zone plate-type liquid crystal lens according to another embodiment of the present invention.

FIG. 8A shows a zone plate-type liquid crystal lens according to another embodiment of the present invention. It is to be noted that, like the lenticular lens units RE1 to RE3, Fresnel lens units FLU1 to FLU4 extend along while being tilted with respect to a column line CL at an angle of θ.

Referring to FIG. 8A, the liquid crystal lens 10 may be formed as a zone plate type lens. The zone plate, also called a Fresnel zone plate, realizes the lensing effect using the light diffraction phenomenon, whereas the GRIN lens realizes the lensing effect using the light refraction phenomenon as shown in FIG. 7A. This zone plate-type liquid crystal lens is disclosed in US Patent Publication No. 2011/0228181, assigned to an applicant of this application and published on Sep. 22, 2011, which is hereby incorporated by reference in its entirety.

In the 3D display mode, voltages are applied to both electrode layers 14 and 24 of the zone plate-type liquid crystal lens 10, so that phase distribution in the liquid crystal layer 18 may correspond to the shape of the Fresnel lens.

Figure 8B:
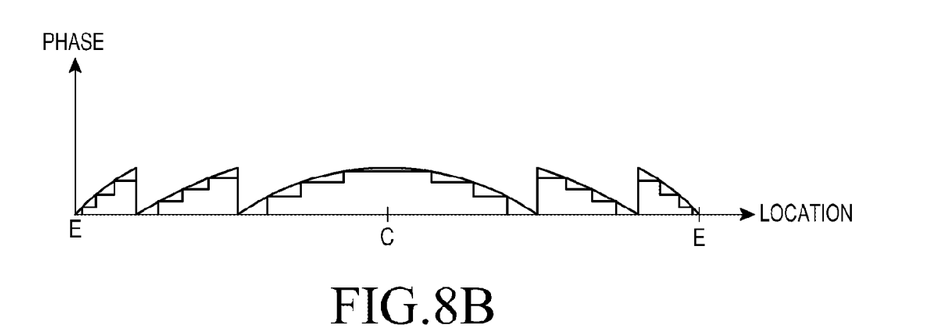
Figure 8C:
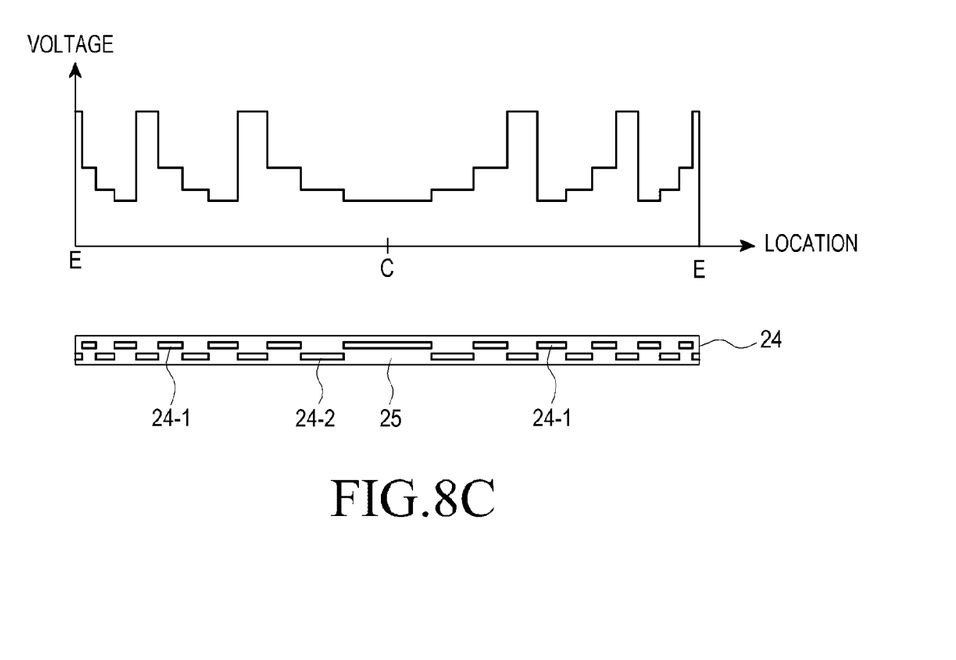

In FIG. 8A, a plurality of Fresnel lenses FLU1 to FLU4 are sequentially formed in the horizontal direction. FIG. 8B shows the phase distribution of one Fresnel lens among the Fresnel lenses FLU1 to FLU4. The phase distribution has a shape of a Fresnel lens. To form this Fresnel lens, voltages are applied to the first and second conductive lines 24-1 and 24-2 of the second conductive layer 24 as shown in FIG. 8C. A ground voltage is applied to the first (or lower) electrode layer 14. Referring to FIGS. 8B and 8C, in a case where the liquid crystal used in the liquid crystal layer 18 has positive dielectric anisotropy, conductive lines 24-1 and 24-2 provided with a higher voltage may have a lower phase, while conductive lines 24-1 and 24-2 provided with a lower voltage may have a higher phase.

The light passing through the zone plate-type liquid crystal lens 10 may experience different phase delays in the horizontal direction as shown in FIG. 8B. Due to the diffraction, eclipse and constructive interference of light in the liquid crystal lens 10, light corresponding to different pixels may be viewed by the viewer 10 depending on his or her viewing angle.

If formed as a zone plate type lens in this way, the liquid crystal lens 10 may significantly reduce a cell gap d of the liquid crystal layer 18.

For example, the GRIN lens-type liquid crystal lens 10 in FIG. 7A has a cell gap d of tens of μm or more. However, the zone plate-type liquid crystal lens 10 in FIG. 8A may be formed to have a cell gap d of about several μm. For example, in the case of a binary-type zone plate, which is a 4-level type zone plate with a thickness of 1.5 to 2 μm, the liquid crystal lens 10 may be realized to have a thickness of 2 to 3 μm.

As such, the zone plate-type liquid crystal lens 10 is suitable for mass production because it may be formed to have a small cell gap d. In addition, because the gap between the first and second substrates 12 and 22 is small, distortion of an electric field due to the fringe field of the conductive lines of the second electrode layer 24 is low, so the zone plate-type liquid crystal lens 10 has an advantage in controlling the liquid crystal directors, making it possible to improve the quality of 3D images.

As is apparent from the foregoing description, the proposed 2D/3D switchable display apparatus matches a polarization direction of light output from a 2D image display panel with a rubbing direction of a lower alignment layer of a liquid crystal lens, and tilts a rubbing direction of an upper alignment layer of the liquid crystal lens and a direction of a polarization axis of a polarizer at a predetermined angle, thereby reducing a loss of light passing through the liquid crystal lens, making it possible to improve luminance of images, improve the quality of 3D images in the horizontal direction, and prevent color separation and moire phenomena.

In addition, the present invention may reduce the number of expensive polarizers required in the 2D/3D switchable display apparatus, making it possible to manufacture the display apparatus in a lightweight, thin and cheap way.

Besides, the present invention may significantly reduce a cell gap of a liquid crystal lens with the use of a zone plate-type liquid crystal lens, thereby facilitating control of liquid crystal directors, making it possible to provide high-quality 3D images and a 2D/3D switchable display apparatus suitable for mass production.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A liquid crystal lens comprising:
   a lens lower substrate;
   a lens lower electrode layer formed on the lens lower substrate;
   a first alignment layer formed on the lens lower electrode layer and rubbed in a direction of a first polarization axis;
   a lens upper substrate;
   a lens upper electrode layer formed on the lens upper substrate;
   a second alignment layer formed on the lens upper electrode layer and aligned in a direction that forms a predetermined acute angle θ with the first polarization axis;
   a liquid crystal layer having liquid crystal filled between the first and second alignment layers; and
   a polarizer formed on the lens upper substrate and having a second polarization axis that forms the predetermined acute angle θ with the first polarization axis.

2. The liquid crystal lens of claim 1, wherein one of the lens lower electrode layer and the lens upper electrode layer includes a plurality of conductive lines, and the plurality of conductive lines are parallel to each other and are oriented at the angle of θ with respect to the first polarization axis.

3. The liquid crystal lens of claim 1, wherein a lens axis of a liquid crystal lens formed by the liquid crystal layer, and the second polarization axis, are parallel to each other.

4. The liquid crystal lens of claim 1, wherein a liquid crystal lens formed by the liquid crystal layer is a GRadient INdex (GRIN) lens.

5. The liquid crystal lens of claim 1, wherein a liquid crystal lens formed by the liquid crystal layer is a Fresnel zone plate.

6. The liquid crystal lens of claim 1, wherein the lens upper electrode layer includes double-layered conductive lines arranged in a zigzag pattern, and each of the conductive lines extends in a direction of the second polarization axis.

7. The liquid crystal lens of claim 1, wherein an alignment direction of the first alignment layer and an alignment direction of the second alignment layer are upside-down twisted by an angle of θ.

8. The liquid crystal lens of claim 1, wherein a voltage is applied across the lens lower electrode layer and the lens upper electrode layer in a 3D display mode, and a voltage is not applied across the lens lower electrode layer and the lens upper electrode layer in a 2D display mode.

* * * * *